(12) United States Patent
Kishino

(10) Patent No.: US 8,469,439 B2
(45) Date of Patent: Jun. 25, 2013

(54) VEHICLE BODY REAR STRUCTURE

(75) Inventor: Kiyohiro Kishino, Hamamatsu (JP)

(73) Assignee: Suzuki Motor Corporation (JP)

( * ) Notice: Subject to any disclaimer, the term of this patent is extended or adjusted under 35 U.S.C. 154(b) by 210 days.

(21) Appl. No.: 12/972,892

(22) Filed: Dec. 20, 2010

(65) Prior Publication Data

US 2011/0156437 A1   Jun. 30, 2011

(30) Foreign Application Priority Data

Dec. 25, 2009   (JP) ................. 2009-294244

(51) Int. Cl.
*B60J 5/02* (2006.01)

(52) U.S. Cl.
USPC ...................................... 296/146.9

(58) Field of Classification Search
USPC ............. 296/146.9, 106, 146.1, 146.4, 146.5, 296/146.6, 146.7, 56, 57.1, 76; 280/730.2, 280/801.1, 802, 804, 806, 807, 808
See application file for complete search history.

(56) References Cited

U.S. PATENT DOCUMENTS

| | | | | |
|---|---|---|---|---|
| 3,713,472 A * | 1/1973 | Dozois | ........................... | 160/189 |
| 4,027,737 A * | 6/1977 | Garry | ................. | 180/11 |
| 4,127,301 A * | 11/1978 | Syrowik | ..................... | 296/37.16 |
| 4,273,368 A | 6/1981 | Tanaka | | |
| 4,289,345 A * | 9/1981 | Tamamushi et al. | ........ | 296/37.16 |
| 4,333,269 A * | 6/1982 | Bascou | ........................... | 49/280 |
| 4,728,141 A * | 3/1988 | Motozawa et al. | ........ | 296/37.16 |
| 5,411,302 A * | 5/1995 | Shimada | ........................ | 292/201 |
| 5,531,498 A * | 7/1996 | Kowall | ........................ | 296/146.4 |
| 5,563,483 A * | 10/1996 | Kowall et al. | ................... | 318/283 |
| 5,851,049 A * | 12/1998 | Squire et al. | ................. | 296/146.4 |
| 5,851,050 A * | 12/1998 | Squire et al. | ................. | 296/146.4 |
| 5,896,703 A * | 4/1999 | Wright et al. | .................... | 49/339 |
| RE36,267 E * | 8/1999 | Moore et al. | ..................... | 49/340 |
| 5,947,536 A * | 9/1999 | Mizuki et al. | .................. | 292/201 |
| 5,982,126 A * | 11/1999 | Hellinga et al. | ............... | 318/468 |
| 6,042,160 A * | 3/2000 | Hamada et al. | ................ | 292/216 |
| 6,055,775 A * | 5/2000 | Dering et al. | .................... | 49/340 |
| 6,055,776 A * | 5/2000 | Dettling et al. | .................. | 49/341 |
| 6,092,336 A * | 7/2000 | Wright et al. | ..................... | 49/339 |
| 6,126,222 A * | 10/2000 | Nguyen et al. | .................. | 296/56 |

(Continued)

FOREIGN PATENT DOCUMENTS

DE    89 02 413 U1    8/1989
DE    102006050144 A1    4/2008

(Continued)

OTHER PUBLICATIONS

German Office Action corresponding to Application No. 10 2010 063 841.2 issued on Sep. 21, 2012.

*Primary Examiner* — Kiran B Patel
(74) *Attorney, Agent, or Firm* — Myers Bigel Sibley & Sajovec, P.A.

(57) ABSTRACT

A vehicle body rear structure has a back door for opening and closing a rear opening of a vehicle body, and a latch engageable with and disengageable from a striker fixed in a lower portion of the rear opening, the back door being pivotally connected to an upper portion of the rear opening via two hinges provided so as to be spaced in the vehicle width direction, and the latch being provided in a lower end portion of the back door, the latch and the striker are offset from the center to the side in the vehicle width direction.

3 Claims, 3 Drawing Sheets

U.S. PATENT DOCUMENTS

| | | | | |
|---|---|---|---|---|
| 6,145,917 A * | | 11/2000 | Ishii et al. | 296/146.1 |
| 6,170,196 B1 * | | 1/2001 | Kato | 49/331 |
| 6,185,868 B1 * | | 2/2001 | Kato | 49/339 |
| 6,227,612 B1 * | | 5/2001 | Stolle et al. | 296/208 |
| 6,318,025 B1 * | | 11/2001 | Sedlak | 49/341 |
| 6,382,706 B2 * | | 5/2002 | Yuge et al. | 296/146.4 |
| 6,398,288 B1 * | | 6/2002 | Yuge | 296/146.4 |
| 6,431,638 B1 * | | 8/2002 | Mrozowski et al. | 296/146.8 |
| 6,454,341 B2 * | | 9/2002 | Tolinski | 296/106 |
| 6,520,557 B2 * | | 2/2003 | Benthaus et al. | 296/76 |
| 6,607,231 B2 * | | 8/2003 | Paiva et al. | 296/56 |
| 6,676,186 B2 * | | 1/2004 | Greif | 296/50 |
| 6,676,190 B2 * | | 1/2004 | Daniels et al. | 296/106 |
| 6,695,377 B2 * | | 2/2004 | Paiva et al. | 296/56 |
| 6,719,356 B2 * | | 4/2004 | Cleland et al. | 296/146.8 |
| 6,733,063 B2 * | | 5/2004 | Paiva et al. | 296/56 |
| 6,755,458 B1 * | | 6/2004 | Oberheide | 296/146.8 |
| 6,776,448 B2 * | | 8/2004 | Matsui et al. | 296/146.4 |
| 6,964,438 B2 * | | 11/2005 | Koike et al. | 292/201 |
| 7,070,226 B2 * | | 7/2006 | Cleland et al. | 296/146.8 |
| 7,137,174 B2 * | | 11/2006 | Derbis et al. | 16/289 |
| 7,631,921 B2 * | | 12/2009 | Lewis et al. | 296/51 |
| 7,637,057 B2 * | | 12/2009 | Matsui et al. | 49/345 |
| 7,644,540 B2 * | | 1/2010 | Ichinose | 49/360 |
| 7,688,013 B2 * | | 3/2010 | Frommer et al. | 318/466 |
| 8,037,639 B2 * | | 10/2011 | Watanabe et al. | 49/340 |
| 8,292,345 B2 * | | 10/2012 | Voyer | 296/26.08 |
| 2001/0008057 A1 * | | 7/2001 | Sakaue et al. | 49/341 |
| 2001/0033086 A1 * | | 10/2001 | Yuge et al. | 296/56 |
| 2002/0038963 A1 * | | 4/2002 | Moon | 296/146.8 |
| 2002/0174604 A1 * | | 11/2002 | Lauderbach et al. | 49/324 |
| 2003/0218357 A1 * | | 11/2003 | Mitsui et al. | 296/146.8 |
| 2004/0020126 A1 * | | 2/2004 | Matsui et al. | 49/138 |
| 2004/0124662 A1 * | | 7/2004 | Cleland et al. | 296/146.4 |
| 2004/0227355 A1 * | | 11/2004 | Koike et al. | 292/216 |
| 2004/0227356 A1 * | | 11/2004 | Koike et al. | 292/216 |
| 2005/0102905 A1 * | | 5/2005 | Ichinose | 49/360 |
| 2006/0137248 A1 * | | 6/2006 | Ichinose | 49/340 |
| 2007/0114802 A1 * | | 5/2007 | Johnson et al. | 292/340 |
| 2009/0202840 A1 | | 8/2009 | Griebel et al. | |

FOREIGN PATENT DOCUMENTS

| | | |
|---|---|---|
| DE | 102008020090 A1 | 10/2009 |
| EP | 0 385 229 B1 | 1/1993 |
| GB | 2 111 918 A | 7/1983 |
| JP | 2005-193827 | 7/2005 |

* cited by examiner

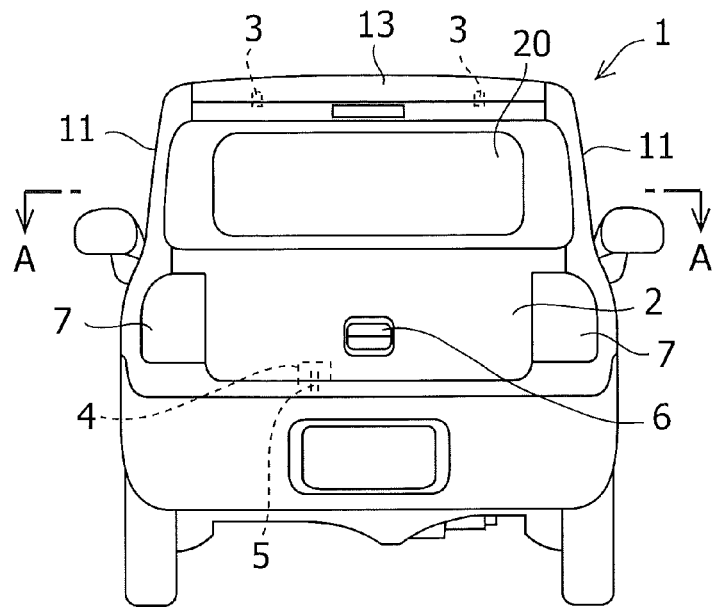
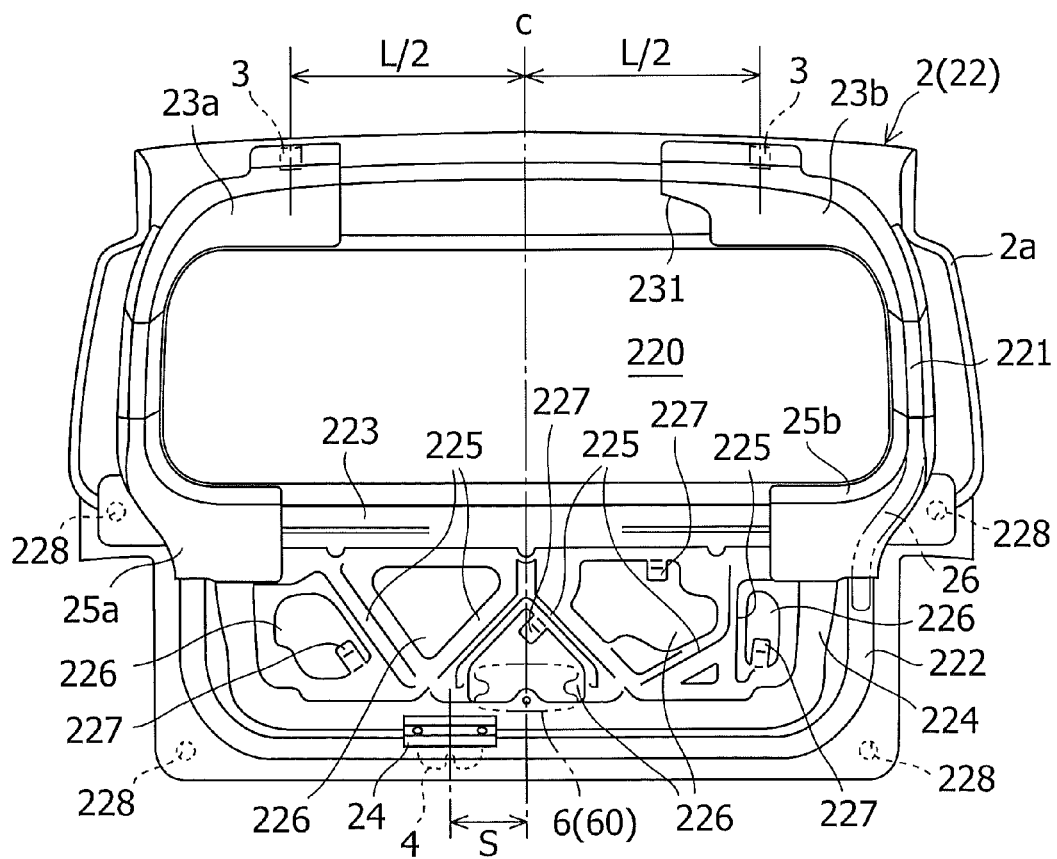

VEHICLE BODY REAR STRUCTURE

CROSS-RELATED APPLICATIONS

This application claims priority from Japanese Patent Application No. 2009-294244; filed Dec. 25, 2009, the disclosure of which is incorporated herein by reference in its entirety.

FIELD OF THE INVENTION

The present invention relates to a vehicle body rear structure of a vehicle equipped with a back door, in particular a hatch back type back door, for opening and closing a vehicle body rear opening.

BACKGROUND OF THE INVENTION

A hatch back type back door has been used widely for not only vans and wagons but also compact passenger cars because the back door of this type can open a vehicle body rear part widely and can be kept in a jumped-up state, and also access to a passenger room (cargo room) space is easy (refer to JP2005-193827A). For a vehicle equipped with such a back door, it has been known that booming noise is generated at the time of low-speed running. When vibrations of an engine rotating at a low speed close to the resonance frequency of back door are transmitted to the vehicle body rear part, the back door vibrates in the vehicle longitudinal direction, and periodic changes in volume take place in the vehicle compartment, whereby booming noise is generated.

As the above-described vibrations of back door, in addition to the vibrations the center of which is a back door hinge, which are caused by elastic deformation of a weather-strip and a stopper, flexural vibrations of the back door itself are assumed. Therefore, to reduce the booming noise, in addition to the improvement in back door mounting rigidity, effective improvement in rigidity of the back door itself is demanded. This demand conflicts with the reduction in weight of the vehicle body. For a compact car in which emphasis is placed on fuel economy and manufacturing cost, it is difficult to achieve a remarkable effect of reducing booming noise in the allowable range in comprehensive performance evaluation.

BRIEF SUMMARY OF THE INVENTION

The present invention has been made in view of the above circumstances, and accordingly, an object thereof is to provide a vehicle body rear structure capable of reducing booming noise generated at the time of low-speed running while the fuel economy and manufacturing cost are maintained to a reasonable degree.

To achieve the above object, the present invention provides a vehicle body rear structure comprising: a back door for opening and closing a rear opening of a vehicle body; and a latch engageable with and disengageable from a striker fixed in a lower portion of the rear opening, the back door being pivotally connected to an upper portion of the rear opening via two hinges provided so as to be spaced in the vehicle width direction, and the latch being provided in a lower end portion of the back door, wherein the latch and the striker are offset from the center to the side in the vehicle width direction.

In the vehicle body rear structure in accordance with the present invention, since the latch (striker) are offset from the center to the side in the vehicle width direction as described above, the inertia weights and natural frequencies on the sides of the back door are asymmetrical with respect to the latch (striker), and torsional vibrations asymmetrical in the right-and-left direction with respect to the latch (striker) are induced on the back door, so that the resonance at a specific frequency is restrained, and the vibration energy transmitted to the back door is diffused and damped because of the structure. Therefore, booming noise can be reduced effectively. Moreover, the above-described configuration can be introduced merely by making a slight design change in the existing configuration, and does not involve an increase in vehicle body weight and an increase in manufacturing cost.

To achieve the above-described effect, it is preferable that the offset amount of the latch (striker) be not less than 5% and not more then 40% of the distance between the two hinges. If the offset amount is less than 5%, torsional vibrations are less liable to be induced, so that a sufficient booming noise reducing effect cannot be achieved. On the other hand, if the offset amount is too large, the maximum amplitude in a portion on the opposite side to the offset direction of back door increases, the vibration damping effect is lost, and the booming noise reducing effect decreases. In addition, there arises a problem that the structural burden imposed on the hinges by a shock load at the time of the back door opening and closing operation increases.

In a preferred mode of the present invention, the back door is configured by joining an outer panel to an inner panel at the peripheral edge portion; the inner panel is formed in a three-dimensional shape including a basic frame part extending along the peripheral edge portion and expanded in the direction such as to separate from the outer panel with respect to the peripheral edge portion, and an auxiliary frame part defining a plurality of lightening hole openings in a middle portion surrounded by the basic frame part; and the latch is disposed at a meeting portion at which the basic frame part meets the auxiliary frame part. In the case in which the latch (striker) are offset as described above, forces not only in the vehicle longitudinal direction or the up-and-down direction but also in the torsion direction act around the latch. In this mode, since the offset latch is disposed at the meeting portion of frame structure having a relatively high rigidity, the locking force of latch can advantageously be caused to act in a wide range of back door.

In a further preferred mode of the present invention, the back door includes a vibration damping structure which is adjacent to the peripheral edge portion located on the opposite side to the offset direction of the latch and is formed of an elastic material interposed between the outer panel and the inner panel. On account of the above-described offset of the latch (striker), an increase of the maximum amplitude in the portion on the opposite side to the offset direction is anticipated. In this mode, however, the provision of a vibration damping structure in this portion is advantageous in restraining or damping the maximum amplitude and torsional vibrations.

In a still further preferred mode of the present invention, the back door further includes reinforcing members for reinforcing the inner panel upper corner portions ranging from the mounting portions of the two hinges to the side portions of a back window opening; and, of the reinforcing members, one reinforcing member located on the opposite side to the offset direction of the latch is expanded to the center side in the vehicle width direction as compared with the other reinforcing member. On account of the above-described offset of the latch (striker), the structural burden near the hinge on the opposite side of the offset direction increases. In this mode, however, the strengths at the right and left can be balanced by the necessary minimum reinforcement of that portion. Also, this mode is advantageous in restraining the maximum amplitude and torsional vibrations caused by the offset.

BRIEF DESCRIPTION OF THE DRAWINGS

FIG. 3 is a rear view showing a state in which a back door of a vehicle to which a vehicle body rear structure in accordance with an embodiment of the present invention is applied is closed;

FIG. 4 is a rear view of a back door, excluding an outer panel and a back window, in accordance with an embodiment of the present invention;

DETAILED DESCRIPTION OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
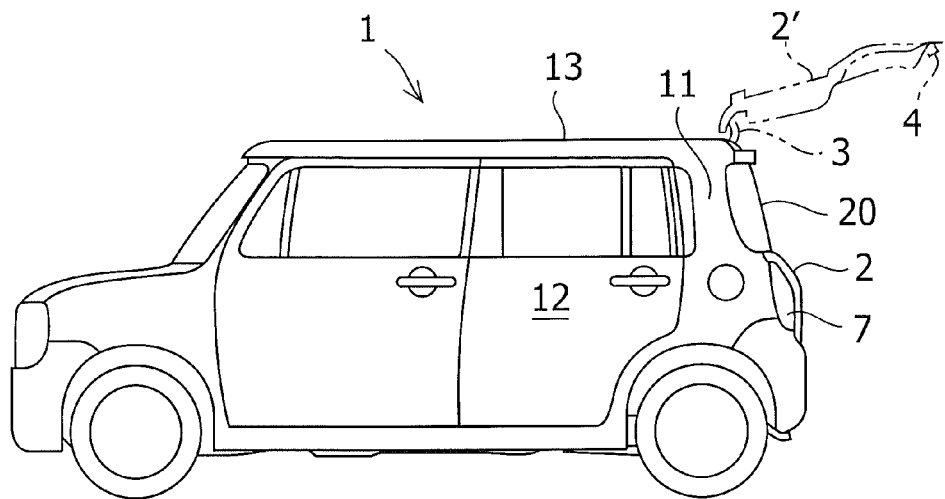
FIG. 1 is a side view of a vehicle to which a vehicle body rear structure in accordance with an embodiment of the present invention is applied.
Figure 2:
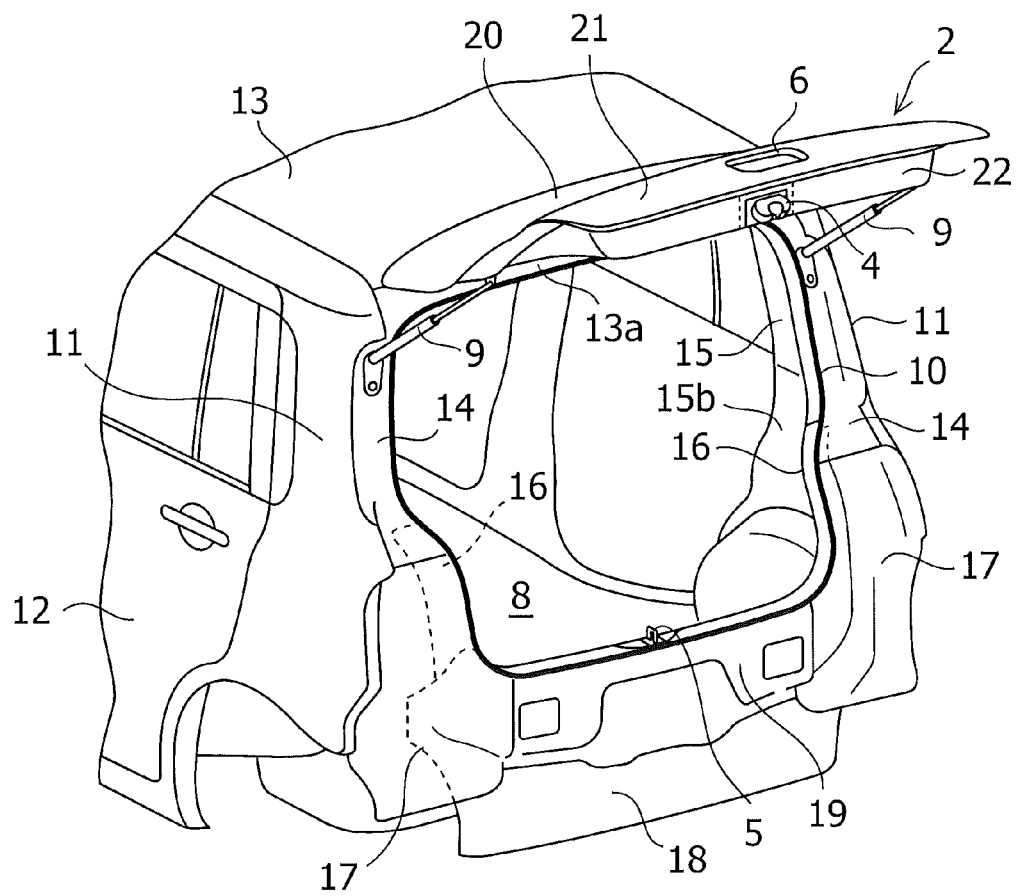
FIG. 2 is a perspective view showing a state in which a back door of vehicle to which a vehicle body rear structure in accordance with an embodiment of the present invention is applied is opened.

In FIGS. 1 to 3, a vehicle 1 is a so-called two-box type motor vehicle in which a hatch back type back door 2 is provided and a cargo room and a passenger room are in a unit. In the vehicle body rear part of the vehicle 1, a back door opening 10 is provided. Before the explanation of the back door 2, a vehicle body structure around the back door opening 10 is described. In the description below, the "joining" of parts is basically joining by welding, such as spot welding; however, other joining methods may be used.

In FIG. 2, under the back door opening 10, a rear panel 18 and a tail end panel 19 joined to the upper rear side of the rear panel 18 are provided, and between these panels, a closed cross section extending in the vehicle width direction along the lower portion of the back door opening 10 is defined. In the example shown in FIG. 2, the lower side of the back door opening 10 is located at a position higher than the rear end portion of a vehicle body floor 8. However, for example, in the case of a van, the back door opening 10 extends down to the vehicle body floor 8.

To both sides in the vehicle width direction of the rear panel 18 and the tail end panel 19, rear lamp house outer extensions 17 serving as mounting parts for rear combination lamps 7 are joined. The edge portions on the outside in the vehicle width direction of the rear lamp house outer extension 17 and a side body outer extension 14 are joined to a side body outer panel 11.

On the other hand, to the surfaces on the vehicle compartment inside of the rear lamp house outer extensions 17, inner extensions 16 defining both-side lower portions of the back door opening 10 are joined, and the upper end of each of the inner extensions 16 is joined to the surface on the vehicle compartment inside of the side body outer extension 14 and a quarter inner upper panel 15 provided on the vehicle compartment inside of the side body outer panel 11. Thereby, closed cross sections extending in the up-and-down direction are defined along the side portions of the back door opening 10. To the lower side of the quarter inner upper panel 15, a quarter inner lower panel 15b is joined, and the quarter inner upper panel 15 and the quarter inner lower panel 15b are joined to the side body outer panel 11 along the opening of a rear door 12.

Furthermore, the upper end portions of the side body outer extensions 14 are joined to a rear end part 13a of a roof panel 13 and a reinforcing member (reinforcement) provided on the lower surface side of the rear end part 13a. This reinforcing member reinforces the vehicle body-side mounting portions of hinges 3, described later, of the back door 2, and is disposed partially on both sides at the right and left. The reinforcing members are joined to both end portions of a roof back inner member (not shown) that defines a closed cross section extending in the vehicle width direction along the upper portion of the back door opening 10 on the lower surface side of the roof panel rear end part 13a.

By the above-described configuration, closed cross sections of the upper portion (13a), both the side portions (11, 14, 15, 16, 17), and the lower portion (18, 19) communicate with each other, whereby a closed cross sectional structure, continuous in a ring shape around the back door opening 10, is formed so that a predefined rigidity is secured around the back door opening 10. Also, in a joined portion (opening flange) of the inner and outer panels disposed along the back door opening 10, an opening trim (10) integral with a weather-strip forming a seal between the joined portion and the back door 2 is fitted.

Next, the back door 2 is explained with reference to the drawings.

As shown in FIGS. 1 to 4, the back door 2 is connected turnably to the roof panel rear end part 13a (reinforcing member), which is located above the back door opening 10, via the two hinges 3 provided so as to be spaced in the vehicle width direction, and can be opened and closed swingingly in the up-and-down direction around the axes of the hinges 3 as shown in FIGS. 1 and 2.

In the lower end portion of the back door 2, a latch 4, which is engageable with and disengageable from a striker 5 fixed to the lower portion of the back door opening 10 (the upper face of the rear panel 18), is provided. By the engagement of the latch 4 with the striker 5, the back door 2 is locked in a closed state. Furthermore, from this locked state, the latch 4 is unlocked from the striker 5 by operating a door handle 6 provided on the outer surface of the back door 2, whereby the back door 2 can be opened. As shown in FIG. 2, in both-side portions of the back door 2, balancers 9 are provided to hold the back door 2 at the open position and to assist the back door opening operation.

FIG. 4 is a rear view showing the rear outer surface side of the back door 2, excluding an outer panel 21 and a back window 20. The back door 2 is formed by joining the outer panel 21 and an inner panel 22 to each other by means of a peripheral edge part 2*a*. In the upper center of the back door 2, a window opening 220 is defined. As shown in FIG. 3, the surface portion corresponding to the window frame portion of the outer panel 21 is also covered by the back window 20.

The inner panel 22 is formed with a peripheral edge portion joined to the outer panel 21 and basic frame parts 221, 222 and 223 that constitute a reinforcing structure having a hat shape or a level difference shape in cross section and are arranged adjacent to the window opening 220. Furthermore, a basic frame part 224 having a hat shape in cross section, which is expanded in the direction such as to separate from the outer panel 21, is formed along the inside of the basic frame part 222 having a level difference shape arranged in the lower portion of the inner panel 22. Of these basic frame parts 221 to 224, the basic frame parts 221 and 222 arranged along the peripheral edge portion on the outside serve as receiving faces for the weather-strip (opening trim) disposed along the back door opening 10.

In the middle portion surrounded by the basic frame part 224 in the lower portion of the inner panel 22, in order to define a plurality of lightening hole openings 226, auxiliary frame parts 225 each having a hat shape in cross section are formed so as to be provided in a slantwise lattice form between the basic frame parts 224 and 223. Also, a plurality of support parts 227 are bendedly formed so as to rise from the edge portions of the lightening hole openings 226 toward the back surface of the outer panel 21. The vertex portion of each of the support parts 227 is joined to the back surface of the outer panel 21 via an elastic seal member having an adhesive property.

To the upper corner portions at the right and left of the inner panel 22, reinforcing members 23*a* and 23*b* (reinforcements), each of which reinforces a portion ranging from the mounting portion of the hinge 3 to the side portion of the back window opening 220, are joined. Also, to the lower corner portions at the right and left of the inner panel 22, which are narrowed by notches corresponding to the rear combination lamps 7, as well, reinforcing members 25*a* and 25*b* (reinforcements) are joined. Furthermore, stopper rubbers 228 for buffering the shock applied when the back door is operated to open are attached to the side portions of the reinforcing members 25*a* and 25*b* adjacent to the notches and onto the surfaces on the vehicle compartment inside of corner portions of the lowermost portions of the back door 2.

To the lower end portion of the back door 2 configured as described above, the latch 4 is attached so as to be offset from the center in the vehicle width direction to the left-hand side in FIG. 4. The latch 4 is attached to the lower surface portion that is the level difference surface of the basic frame part 224 having a hat shape in cross section of the inner panel 22, and a reinforcing member 24 (reinforcement) is joined to the back surface of the inner panel 22 in the latch mounting portion.

Also, the attachment position of the latch 4 in the example shown in FIG. 4 is adjacent to the meeting portion at which the basic frame part 224 and the two auxiliary frame parts 225 meet. Such a meeting portion is a portion having a high rigidity in terms of structure. Although the striker 5 is similarly disposed shiftedly so as to correspond to the arrangement of the latch 4, the door handle 6 is disposed in the center in the vehicle width direction as schematically shown by only a mounting hole 60 in FIG. 4. The mechanism part of the latch 4 is connected to the mechanism part of the door handle 6 via a Bowden cable or a rod, not shown.

Next, the operation based on the above-described embodiment is explained.

In the closed state, the back door 2 is supported by three points of the two hinges 3 arranged so as to separate an equal distance L/2 to both sides from the center (c) in the vehicle width direction and the latch 4 (striker 5) arranged so as to be offset a distance S to the side from the center (c) in the vehicle width direction. Therefore, the back door 2 itself is formed so as to be substantially symmetrical in the right-and-left direction, and the two hinges 3 are arranged so as to be symmetrical in the right-and-left direction. The inertia weights on the right and left sides of the back door 2 with the latch 4 (striker 5) being the center are asymmetrical. Therefore, for example, at the time of low-speed running, when vibrations in the vehicle longitudinal direction or the up-and-down direction are transmitted to the back door 2, torsional vibrations that are asymmetrical in the right-and-left direction with respect to the latch 4 (striker 5) are induced on the back door 2.

The amplitude (flexural deformation) of the back door 2 on account of the above-described vibrations is at the maximum at the middle portion between the upper and lower support points (3, 4), but is actually very small. To verify such torsional vibrations of the back door 2, the vibration mode of the back door 2 was analyzed by using a 3D-CG model. The vehicle used for the analysis was a light passenger car having an overall length of 3395 mm and an overall width of 1475 mm. The back door was configured so that the hinge-to-hinge distance L is was 650 mm and the offset amount S was 100 mm, and the vibration direction of the vibration source was set at the vehicle longitudinal direction.

Figure 5:
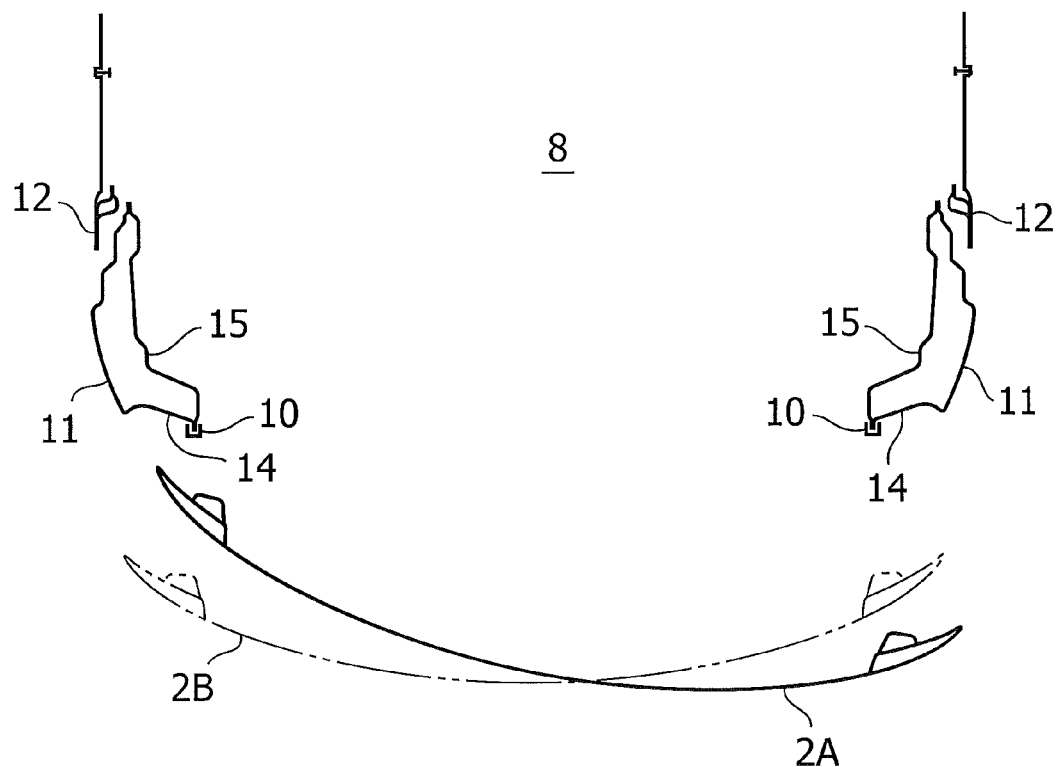
FIG. 5 is a sectional view taken along the line A-A of FIG. 3, showing the vibration modes of a back door in an embodiment of the present invention and a comparative example, visualized at an enhanced magnification of ×2000.

FIG. 5 is a horizontal sectional view showing the result of analysis. In this figure, the maximum amplitude of the back door 2 is visualized by being enlarged at an enhanced magnification of ×2000. In FIG. 5, symbol 2A denotes the maximum amplitude of the back door 2 in accordance with the embodiment of the present invention, and symbol 2B denotes the maximum amplitude of a back door having the same shape in which the latch (striker) are disposed in the center in the vehicle width direction, shown as a comparative example.

As shown in FIG. 5, for the back door in accordance with the embodiment of the present invention (2A), the maximum amplitude of the right-hand side portion in the figure is larger than that of the comparative example (2B) because the latch 4 (striker 5) are offset to the left-hand side in the figure; however, the vibration amount as a whole decreases. This is apparent from the fact that the area of a wedge-shaped portion held between two loci 2A and 2B on the right-hand and left-hand sides of the intersection of the two loci 2A and 2B is larger in the left-hand side portion of the intersection than in the right-hand side portion thereof. Comparing the areas before and after deformation, the area decreases by about 5%. This value corresponds to the change in volume in the vehicle compartment caused by the vibrations of the back door 2, showing a decrease in sound pressure level of booming noise.

Figure 6:
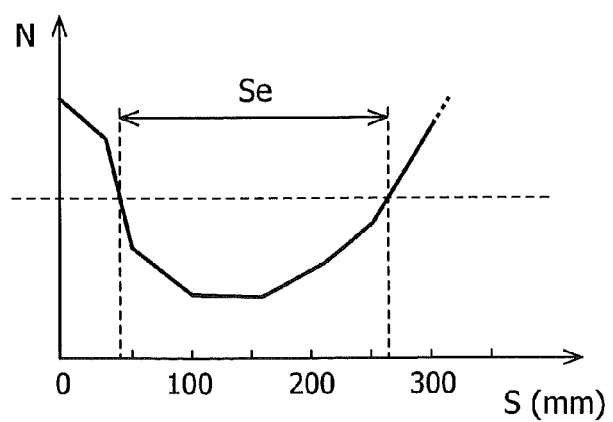
FIG. 6 is a graph showing the relationship between the offset amount of latch (striker) and the low-frequency vibration level.

FIG. 6 shows the relationship between the offset amount S of the latch 4 (striker 5) and the low-frequency vibration level (N) of booming noise in the above-described vibration mode analysis. FIG. 6 shows a tendency such that the low-frequency vibration level (N) of booming noise decreases with the increase of offset amount S in the region in which the offset amount S is relatively small, and increases thereafter.

This phenomenon shows that if the offset amount S is too large, the maximum amplitude in a portion on the opposite side to the offset direction of back door increases, and the vibration damping effect is lost. Because of such a tendency, the offset amount S of the latch 4 (striker 5) is preferably 5 to 40% of the hinge-to-hinge distance L corresponding to range (33 mm to 260 mm) indicated by Se in FIG. 6. In the above-described embodiment (hinge-to-hinge distance L=650 mm, offset amount S=100 mm), the offset amount S is 15.4% of the hinge-to-hinge distance L.

There is no denying the fact that on account of the offset of the latch 4 (striker 5), the structural burden on the right and left hinges 3 at the time when the back door is opened and closed increases. In the above-described embodiment, the reinforcing members 23a and 23b are provided in the mounting portions of the hinges 3 of the back door 2, so that no strength problem occurs. As shown in FIG. 4, an expanded part 231 expanding to the center side in the vehicle width direction may be provided on the reinforcing member 23b located on the opposite side to the offset of the latch 4 to compensate the increase in burden of the hinge mounting part (23b) by means of the improvement in rigidity.

Also, as shown in FIG. 4, an elastic material 26 interposed between the outer panel 21 and the inner panel 22 may be provided in the basic frames 221 and 222 of the back door 2 located on the opposite side to the offset direction of the latch 4 (the side on which the maximum amplitude in the torsional vibrations increases) to form a vibration damping structure. As the elastic material 26, various kinds of elastic materials such as rubber and elastomer can be used, and a composite elastic material, in which a foamed material such as foamed urethane or foamed rubber is filled in a hollow rubber material to improve the elastic modulus, is especially suitable.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. A vehicle body rear structure comprising:
   a back door for opening and closing a rear opening of a vehicle body; and
   configured by joining an outer panel to an inner panel at the peripheral edge portion;
   a latch engageable with and disengageable from a striker fixed in a lower portion of the rear opening, the back door being pivotally connected to an upper portion of the rear opening via two hinges provided so as to be spaced in the vehicle width direction, and the latch being provided in a lower end portion of the back door,
   wherein the latch and the striker are offset from the center to the side in the vehicle width direction and the offset amount of the latch and the striker is not less than 5% and not more then 40% of the distance between the two hinges; and
   wherein the back door comprises a vibration damping structure which is adjacent to the peripheral edge portion located on the opposite side to the offset direction of the latch and is formed of an elastic material interposed between the outer panel and the inner panel.

2. The vehicle body rear structure according to claim 1, wherein the inner panel of the back door is formed in a three-dimensional shape including a basic frame part extending along the peripheral edge portion and expanded in the direction so as to separate from the outer panel with respect to the peripheral edge portion, and an auxiliary frame part defining a plurality of lightening hole openings in a middle portion surrounded by the basic frame part; and the latch is disposed at a meeting portion at which the basic frame part meets the auxiliary frame part.

3. The vehicle body rear structure according to claim 1, wherein the back door further comprises reinforcing members for reinforcing the inner panel upper corner portions ranging from the mounting portions of the two hinges to the side portions of a back window opening; and, of the reinforcing members, one reinforcing member located on the opposite side to the offset direction of the latch is expanded to the center side in the vehicle width direction as compared with the other reinforcing member.

\* \* \* \* \*